(12) United States Patent
Jiang

(10) Patent No.: US 12,621,783 B2
(45) Date of Patent: May 5, 2026

(54) METHOD AND APPARATUS FOR RANDOM ACCESS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 636 days.

(21) Appl. No.: 18/005,126

(22) PCT Filed: Jul. 31, 2020

(86) PCT No.: PCT/CN2020/106376
§ 371 (c)(1),
(2) Date: Jan. 11, 2023

(87) PCT Pub. No.: WO2022/021405
PCT Pub. Date: Feb. 3, 2022

(65) Prior Publication Data
US 2023/0300767 A1 Sep. 21, 2023

(51) Int. Cl.
*H04W 56/00* (2009.01)
*H04W 74/0833* (2024.01)

(52) U.S. Cl.
CPC ... *H04W 56/0045* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2012/0314652 A1* | 12/2012 | Ahn | ................. | H04W 56/0045 370/328 |
| 2021/0029658 A1* | 1/2021 | Mahalingam | ........ | H04B 7/1851 |
| 2022/0159741 A1* | 5/2022 | Hoang | .............. | H04W 74/0833 |
| 2023/0300767 A1* | 9/2023 | Jiang | ................. | H04W 56/0045 370/329 |
| 2023/0319822 A1* | 10/2023 | Park | ..................... | H04W 72/11 370/329 |

FOREIGN PATENT DOCUMENTS

| | | |
|---|---|---|
| KR | 20130097586 A | 9/2013 |
| RU | 2702893 C1 | 10/2019 |

OTHER PUBLICATIONS

International Search Report and Written Opinion of International Application No. PCT/CN2020/106376, mailed Apr. 29, 2021, 16 pages.

(Continued)

*Primary Examiner* — Faiyazkhan Ghafoerkhan
(74) *Attorney, Agent, or Firm* — Finnegan, Henderson, Farabow, Garrett & Dunner, L.L.P.

(57) ABSTRACT

A method for random access is applied to a terminal, and includes: receiving feedback information from a base station during a random access procedure according to at least one of first receiving timing information or second receiving timing information; wherein the first receiving timing information and the second receiving timing information correspond to different manners for determining a timing advance by the terminal; and wherein the first receiving timing information is different from the second receiving timing information.

18 Claims, 3 Drawing Sheets in response to a timing advance being determined by the terminal autonomously, receiving feedback information from a base station during a random access procedure according to first receiving timing information; in response to the timing advance being determined by the terminal non-autonomously, receiving feedback information from the base station during the random access procedure according to second receiving timing information; in which the first receiving timing information is different from the second receiving timing information

S101

(56) References Cited

OTHER PUBLICATIONS

CATT; Discussion on Random Access Procedure for NTN, 3GPP TSG RAN WG2 Meeting #107bis, R2-1912159, Chongqing, P.R. China, Oct. 14-18, 2019, 8 pages.

3GPP TR 38.821, V16.0.0 (Dec. 2019), 3rd Generation Partnership Project; Technical Specification Group Radio Access Network; Solutions for NR to support non-terrestrial networks (NTN) (Release 16), 140 pages.

The Second Office Action issued by the State Intellectual Property Office of People's Republic of China on Jan. 24, 2025, in corresponding Application No. CN 202211146425.4, 18 pages.

"TP on RACH capacity evaluation and procedures", ZTE Corporation, Sanechips, China Southern Power Grid Co., Ltd., 3GPP TSG-RAN WG2 Meeting #107bis, R2-1912665, Chongping, China, Oct. 14-18, 2019, 10 pages.

Office Action for Russian Application No. 2023101332/07, dated May 18, 2023, 12 pages.

Examination report for Indian Application No. 202347006838, issued on May 22, 2023, 6 pages.

European Patent Office, Extended European Search Report issued in Application No. 20947479.0, dated Aug. 22, 2023, 15 pages.

ZTE Corporation, Sanechips, China Southern Power Grid Co., Ltd, Ericsson, "TP on Random Access for UE with location information", 3GPP TSG-RAN WG2 Meeting#107, R2-1911768, Prague, Czech, Aug. 26-30, 2019, 16 pages.

Huawei, HiSilicon, "Random access without location information", 3GPP TSG-RAN WG2 Meeting 107Bis, R2-1913784, Update of R2-1911233, Chongqing, China, Oct. 14-18, 2019, 5 pages.

OPPO, "Left issues on random access procedure in NTN", 3GPP TSG-RAN WG2 Meeting #107bis, R2-1913335, Chongqing, China, Oct. 14-18, 2019, 5 pages.

ZTE Corporation, Sanechips, China Southern Power Grid Co., Ltd, "TP on RACH capacity evaluation and procedures", 3GPP TSG-RAN WG2 Meeting#107bis, R2-1914069, Chongqing, China, Oct. 14-18, 2019, 9 pages.

* cited by examiner in response to a timing advance being determined by the terminal autonomously, receiving feedback information from a base station during a random access procedure according to first receiving timing information; in response to the timing advance being determined by the terminal non-autonomously, receiving feedback information from the base station during the random access procedure according to second receiving timing information; in which the first receiving timing information is different from the second receiving timing information

Figures 1, 2, 3, 4, 5:
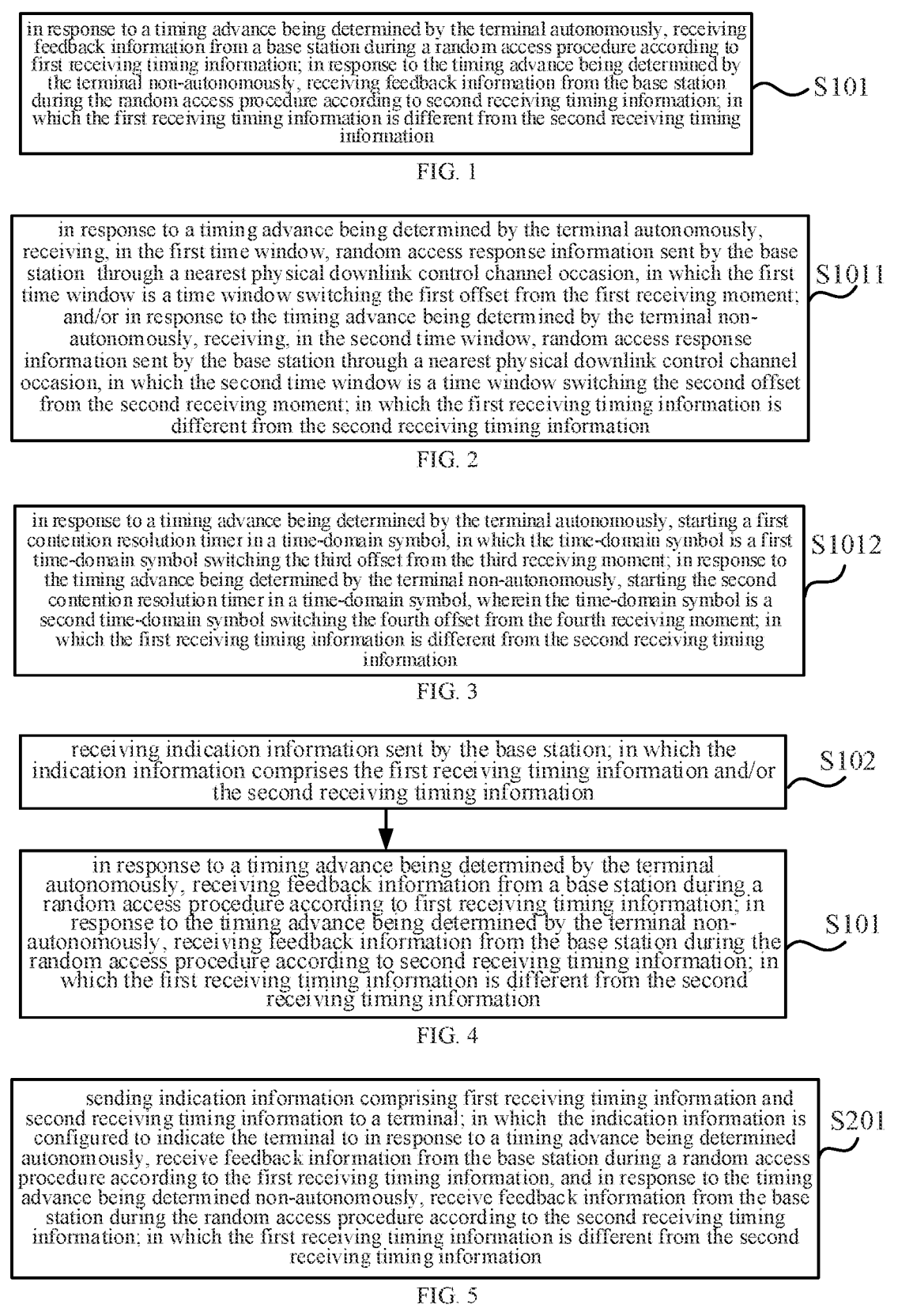

S101

FIG. 1 in response to a timing advance being determined by the terminal autonomously, receiving, in the first time window, random access response information sent by the base station through a nearest physical downlink control channel occasion, in which the first time window is a time window switching the first offset from the first receiving moment; and/or in response to the timing advance being determined by the terminal non-autonomously, receiving, in the second time window, random access response information sent by the base station through a nearest physical downlink control channel occasion, in which the second time window is a time window switching the second offset from the second receiving moment; in which the first receiving timing information is different from the second receiving timing information

S1011

FIG. 2 in response to a timing advance being determined by the terminal autonomously, starting a first contention resolution timer in a time-domain symbol, in which the time-domain symbol is a first time-domain symbol switching the third offset from the third receiving moment; in response to the timing advance being determined by the terminal non-autonomously, starting the second contention resolution timer in a time-domain symbol, wherein the time-domain symbol is a second time-domain symbol switching the fourth offset from the fourth receiving moment; in which the first receiving timing information is different from the second receiving timing information

S1012

FIG. 3 receiving indication information sent by the base station; in which the indication information comprises the first receiving timing information and/or the second receiving timing information

S102 in response to a timing advance being determined by the terminal autonomously, receiving feedback information from a base station during a random access procedure according to first receiving timing information; in response to the timing advance being determined by the terminal non-autonomously, receiving feedback information from the base station during the random access procedure according to second receiving timing information; in which the first receiving timing information is different from the second receiving timing information

S101

FIG. 4 sending indication information comprising first receiving timing information and second receiving timing information to a terminal; in which the indication information is configured to indicate the terminal to in response to a timing advance being determined autonomously, receive feedback information from the base station during a random access procedure according to the first receiving timing information, and in response to the timing advance being determined non-autonomously, receive feedback information from the base station during the random access procedure according to the second receiving timing information; in which the first receiving timing information is different from the second receiving timing information

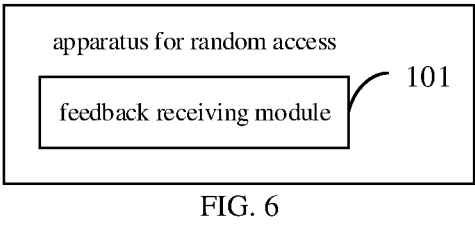
FIG. 6
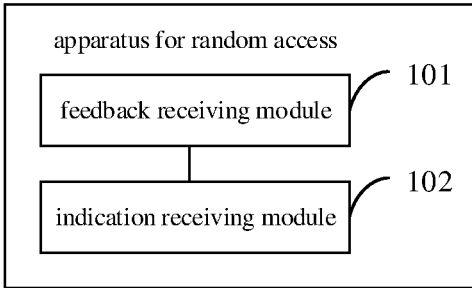
FIG. 7
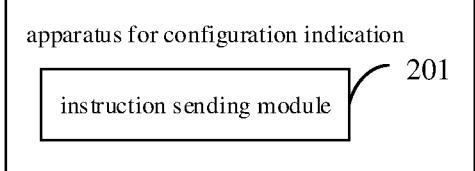
FIG. 8
FIG. 9

METHOD AND APPARATUS FOR RANDOM ACCESS

CROSS-REFERENCE TO RELATED APPLICATION

The present application is a U.S. national phase application of International Application PCT/CN2020/106376, filed Jul. 31, 2020, the entire contents of which are incorporated herein by reference.

TECHNICAL FIELD

The present disclosure relates to a field of a communication technology, and in particular to a method for random access, a method for configuration indication, an apparatus for random access, an apparatus for configuration indication, a communication device and a computer-readable storage medium.

BACKGROUND

With the development of the communication technology, there is a need to communicate between base stations and terminals at any position on ground. However, the base stations in a current network are located on the ground, which restricts the provision of the base stations, and it is difficult to fully cover the ground through the base stations on the ground. Therefore, it is considered to incorporate satellites for coverage.

In a terrestrial network, the base station may send a timing advance (TA for short) to a terminal, so that an uplink signal frame sent by the terminal corresponds to a downlink signal frame sent by the base station.

However, in a case of communicating in a non-terrestrial network (NTN for short) using a satellite, since the satellite is in air and moves at a high speed, when the base station communicates with the terminal through the satellite, there is a large delay, and the timing advance is determined according to the delay, so the timing advance is relatively large, which may cause some problems.

SUMMARY

In view of this, embodiments of the present disclosure provide a method for random access, a method for configuration indication, an apparatus for random access, an apparatus for configuration indication, a communication device and a computer-readable storage medium to solve technical problems in related art.

According to a first aspect of embodiments of the present disclosure, a method for random access is provided. The method is applied to a terminal, and includes in response to a timing advance being determined by the terminal autonomously, receiving feedback information from a base station during a random access procedure according to first receiving timing information; and in response to the timing advance being determined by the terminal non-autonomously, receiving feedback information from the base station during the random access procedure according to second receiving timing information. The first receiving timing information is different from the second receiving timing information.

According to a second aspect of embodiments of the present disclosure, a method for configuration indication is provided. The method is applied to a base station and includes sending indication information including first receiving timing information and second receiving timing information to a terminal. The indication information is configured to indicate the terminal to in response to a timing advance being determined autonomously, receive feedback information from the base station during a random access procedure according to the first receiving timing information, and in response to the timing advance being determined non-autonomously, receive feedback information from the base station during the random access procedure according to the second receiving timing information. The first receiving timing information is different from the second receiving timing information.

According to a third aspect of embodiments of the present disclosure, a communication device is provided. The communication device includes a processor; and a memory for storing instructions executable by the processor. The processor is configured to implement the instructions to perform the method for random access according to any one of the above-mentioned embodiments and/or the method for configuration indication according to any one of the above-mentioned embodiments.

BRIEF DESCRIPTION OF THE DRAWINGS

The accompanying drawings used in description of embodiments will be briefly introduced below. Apparently, the drawings in the following description are only used to illustrate example embodiments of the present disclosure. For those skilled in the art, other embodiments may also be obtained.

FIG. 1 is a flowchart illustrating a method for random access according to an embodiment of the present disclosure.

FIG. 2 is a flowchart illustrating a method for random access according to an embodiment of the present disclosure.

FIG. 3 is a flowchart illustrating a method for random access according to an embodiment of the present disclosure.

FIG. 4 is a flowchart illustrating a method for random access according to an embodiment of the present disclosure.

FIG. 5 is a flowchart illustrating a method for configuration indication according to an embodiment of the present disclosure.

FIG. 6 is a block diagram illustrating an apparatus for random access according to an embodiment of the present disclosure.

FIG. 7 is a block diagram illustrating an apparatus for random access according to an embodiment of the present disclosure.

FIG. 8 is a block diagram illustrating an apparatus for configuration indication according to an embodiment of the present disclosure.

FIG. 9 is a block diagram illustrating an apparatus for configuration indication according to an embodiment of the present disclosure.

DETAILED DESCRIPTION

Figure 10:
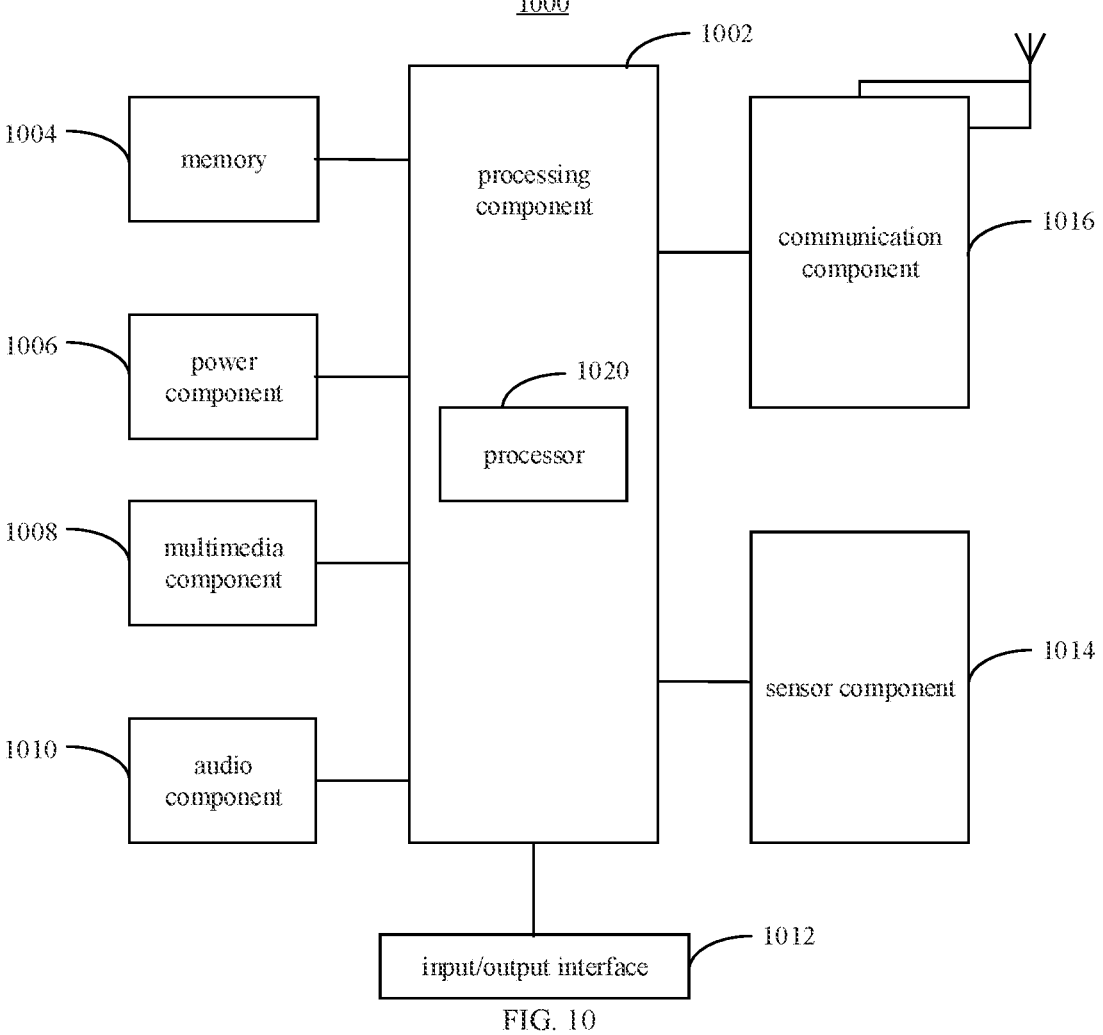
FIG. 10 is a block diagram illustrating a device for random access according to an embodiment of the present disclosure.

The following will clearly and completely describe the technical solutions in embodiments of the present disclosure with reference to the accompanying drawings in embodiments of the present disclosure. Apparently, the described embodiments are only some of embodiments of the present disclosure, not all embodiments of the present disclosure. Based on embodiments of the present disclosure, all other embodiments obtained by those skill in the art without making creative works belong to the protection scope of the present disclosure.

FIG. 1 is a flowchart illustrating a method for random access according to an embodiment of the present disclosure. The method shown in embodiments may be applied to terminals in non-terrestrial networks, and the terminals include, but are not limited to, electronic devices such as mobile phones, tablet computers, wearable devices, sensors, and Internet of Things devices. The terminal may serve as a user equipment to communicate with a base station, and the base station may be a base station located on the ground in the non-terrestrial network, or a network device located in air in a non-terrestrial network, such as a satellite, an aerial platform, and the like. The following is an exemplary description in case that the network device is a satellite.

As shown in FIG. 1, the method for random access may include the following step S101.

In step S101, feedback information is received from a base station during a random access procedure according to first receiving timing information in response to a timing advance being determined by the terminal autonomously, and feedback information is received from the base station during the random access procedure according to second receiving timing information in response to the timing advance being determined by the terminal non-autonomously.

The first receiving timing information is different from the second receiving timing information.

It is noted that the first receiving timing information and/or the second receiving timing information in all embodiments of the present disclosure may be configured by the base station to the terminal, or may be determined by the terminal itself, which may be determined according to needs, and is not limited in the present disclosure.

In a non-terrestrial network, whether the terminal communicates with the base station located on the ground or communicates with a satellite serving as a base station, the communication signal needs to be sent to the satellite. Since the satellite is located in air, it takes a long time for the communication signal to be transmitted to the satellite, resulting in a large communication delay between the terminal and the base station, which may even reach a maximum of 541.46 ms.

In order to compensate for the communication delay in the non-terrestrial network, the terminal may perform compensation based on the timing advance during a communication process, and the compensation process generally includes two ways as follows.

The first way is that the terminal autonomously determines the timing advance, which is applied to a situation where the terminal may determine its own location. The terminal may calculate the delay that needs to be compensated for according to a distance from the terminal to the satellite, which is applied to the satellite regeneration mode, that is, the satellite used as the base station. Alternatively, the terminal may calculate the delay that needs to be compensated for according to a distance from the terminal to the satellite, and a distance or the delay between the satellite and the base station, which is applied to the base station located on the ground.

The delay to be compensated for and determined by the terminal may be used as the timing advance, and the timing advance may be reported to the base station during the random access procedure, for example, Msg3 or MsgA carried in the random access procedure. When the terminal communicates with the base station, all the timing advances may be compensated for, or a common timing advance (referred to as common TA) broadcasted by the network may be received, and partial compensation is performed, such as compensating for differences between all the timing advances and the common timing advance.

The second way is that the terminal non-autonomously determines the timing advance, which is applied to a situation where the terminal cannot determine its own location. The terminal may receive the common timing advance broadcasted by the network, and then compensate for the common timing advance w % ben communicating with the base station. Alternatively, the terminal does not compensate for the timing advance, but the network compensates for the common timing advance. For example, the satellite compensates for the common timing advance.

For example, a distance from the satellite to a reference point on the ground (which may refer to a projected position of the satellite on the ground) is d0, a distance from the satellite to the terminal is d1, a distance from the satellite to the base station is d0_F, and a speed of light is c. Thus, in the satellite regeneration mode, the common timing advance is equal to a two-way delay from the satellite to the reference point on the ground, that is, equal to 2*d0/c. When the terminal communicates with the base station on the ground, the common timing advance is equal to a sum of a two-way delay from the satellite to the reference point on the ground and a two-way delay from the satellite to the base station on the ground, that is, equal to 2*(d0+d0_F)/c.

It could be seen that the delay compensated for by the terminal based on the above-mentioned two ways are different.

In case that the timing advance is determined by the terminal autonomously, since the position of the terminal may be determined, the timing advance determined accordingly is relatively accurate, and the compensated delay is relatively accurate. Generally, an error between an actual delay and a compensated delay may be within 1 ms.

In case that the timing advance is determined by the terminal non-autonomously, since the timing advance is not determined according to the position of the terminal, the compensation is performed based on the common timing advance. The common timing advance does not include the distance d1 from the satellite to the terminal, but only includes the distance do from the satellite to the reference point on the ground, so that the actual delay and the compensated delay have a large error, which is positively correlated with the difference between d1 and d0. For a cell with a coverage radius of 3500 km, the error may even reach 20.6 ms.

In order to compensate for the delay during the random access procedure, the terminal needs to perform compensation according to the above-mentioned way of autonomously determining the timing advance or the above-mentioned way of non-autonomously determining the timing advance. That is, during the random access procedure, when information, such as Msg1, Msg3, MsgA or the like is sent, it is required to bring forward all the timing advances, or bring forward a difference between all the timing advances and the common timing advance in the way of determining the timing advance autonomously. Alternatively, it is required to bring forward the common timing advance in the way of determining the timing advance non-autonomously, or the common timing advance is compensated for by the network.

In addition, when the terminal receives the feedback information from the base station during the random access procedure, the feedback information needs to be received according to the above-mentioned delay. For example, for the random access response sent by the base station, the terminal may receive the feedback information after sending Msg1. However, due to the existence of the above-mentioned delay, the feedback information may be sent to the terminal at the earliest after the above-mentioned delay after the terminal sends Msg1, so after the terminal sends Msg1, it needs to wait at least the above-mentioned delay before receiving the feedback information sent by the base station.

From the above-mentioned content, it could be seen that when the terminal autonomously determines the timing advance, and when the terminal non-autonomously determines the timing advance, the delays that need to be compensated for are different. In case that the timing advance is determined by the terminal autonomously, the delay that needs to be compensated for is determined according to the distance d1 between the terminal and the satellite. In case that the timing advance is determined by the terminal non-autonomously, the delay that needs to be compensated for is indicated to the terminal by the satellite or the base station, and is determined according to the distance d0 from the satellite to the reference point on the ground.

In general, d1 is not equal to d0, and d1 is a real distance between the terminal and the satellite. Thus, the delay to be compensated for that is determined according to d1 is relatively accurate, and the delay to be compensated for that is determined according to d0 has a large error. If the terminal only receives the feedback information according to one kind of receiving timing information, in order to adapt to the above-mentioned two compensation ways, it needs to meet the situation of the large error of the delay and the situation of relatively accurate delay. Thus, d0 is used as the delay that needs to be compensated for to determine the reception of the feedback information, so that the terminal needs to receive the feedback information more in advance, and a duration of the reception is relatively longer, so as to ensure that the feedback information may be received in case that the delay error is large.

According to embodiments of the present disclosure, the base station may indicate different receiving timing information in case that the timing advance is determined by the terminal autonomously and in case that the timing advance is determined by the terminal non-autonomously. Thus, the terminal may receive the feedback information from the base station during the random access procedure based on the first receiving timing information in case that the timing advance is determined by the terminal autonomously, and receive the feedback information from the base station during the random access procedure based on the second receiving timing information in case that the timing advance is determined by the terminal non-autonomously. The first receiving timing information is different from the second receiving timing information.

That is, the terminal may receive the feedback information from the base station based on different receiving timing information, such as Msg2. Msg4 or the like, in case that the timing advance is determined by the terminal autonomously and in case that the timing advance is determined by the terminal non-autonomously.

For example, the above-mentioned receiving timing information includes two parts of information, i.e., an offset and a length of a time window. In case that the timing advance is determined by the terminal autonomously, since the error of the delay that needs to be compensated for is small, the terminal may relatively accurately determine a moment when the feedback information from the base station reaches, so that the feedback information may be received after an offset with a relatively large delay. The length of the time window for receiving the feedback information may be relatively short, so as to shorten the time consumption of the random access procedure.

In case that the timing advance is determined by the terminal non-autonomously, since the error of the delay that needs to be compensated for is large, it is hard for the terminal to accurately determine a moment when the feedback information from the base station reaches, so that the feedback information may be received after an offset with a relatively small delay. The length of the time window for receiving the feedback information may be relatively long, so as to ensure that the feedback information from the base station may be received, thus successfully completing the random access procedure.

In some embodiments, the first receiving timing information includes a first offset of a first time window for receiving a random access response relative to a first receiving moment, and/or a first length of the first time window.

Alternatively, the second receiving timing information includes a second offset of a second time window for receiving a random access response relative to a second receiving moment, and/or a second length of the second time window.

The first offset is different from the second offset, and/or the first length is different from the second length.

In an embodiment, the first receiving timing information and the second receiving timing information may include two parts, i.e., the offset and/or the length of the time window.

Specifically, the first receiving timing information may include the first offset of the first time window for receiving the random access response relative to the first receiving moment, and/or the first length of the first time window. The second receiving timing information may include the second offset of the second time window for receiving the random access response relative to the second receiving moment, and/or the second length of the second time window. The first offset may be different from the second offset, and/or the first length may be different from the second length.

The first receiving timing information may only include the first offset, or only include the first length of the first time window, or include both the first offset and the first length of the first time window. The second receiving timing information may only include the second offset, or only include the second length of the second time window, or include both the second offset and the second length of the second time window.

For example, the first receiving timing information includes the first offset and the first length of the first time window, and the second receiving timing information includes the second offset and the second length of the second time window.

In case that the timing advance is determined by the terminal autonomously, since the error of the delay that needs to be compensated for is small, the terminal may relatively accurately determine the moment w % ben the feedback information from the base station reaches, so that the feedback information may be received after the first offset with a relatively large delay. The first length of the first time window for receiving the feedback information may be relatively short, so as to shorten the time consumption of the random access procedure.

In case that the timing advance is determined by the terminal non-autonomously, since the error of the delay that needs to be compensated for is large, it is hard for the terminal to accurately determine the moment when the feedback information from the base station reaches, so that the feedback information may be received after the second offset with a relatively small delay, and the second length of the second time window for receiving the feedback information may be relatively long, so as to ensure that the feedback information from the base station may be received, thus successfully completing the random access procedure.

FIG. 2 is a flowchart illustrating a method for random access according to an embodiment of the present disclosure. As shown in FIG. 2, receiving the feedback information from the base station during the random access procedure according to the first receiving timing information includes the following step S1011.

In step S1011, random access response information sent by the base station is received in the first time window through a nearest physical downlink control channel occasion (PDCCH occasion). The first time window is a time window switching the first offset from the first receiving moment, and/or receiving the feedback information from the base station during the random access procedure according to the second receiving timing information includes receiving, in the second time window, random access response information sent by the base station through a nearest physical downlink control channel occasion, in which the second time window is a time window switching the second offset from the second receiving moment.

In an embodiment, in case that the timing advance is determined by the terminal autonomously, the terminal may receive, in the first time window, the random access response information sent by the base station through the nearest physical downlink control channel occasion, and the first time window is a time window switching the first offset from the first receiving moment.

In an embodiment, in case that the timing advance is determined by the terminal non-autonomously, the terminal may receive, in the second time window, the random access response information sent by the base station through the nearest physical downlink control channel occasion, and the second time window is a time window switching the second offset from the second receiving moment.

In some embodiments, each of the first receiving moment and the second receiving moment is a moment that Msg1 or MsgA for the random access procedure is sent completely.

In an embodiment, during a four-step random access procedure, the terminal may receive, in the first time window, the random access response information sent by the base station through the nearest physical downlink control channel occasion, and the first time window is a time window switching the first offset from the moment of completing sending Msg1.

In an embodiment, during a two-step random access procedure, the terminal may receive, in the second time window, the random access response information sent by the base station through the nearest physical downlink control channel occasion, and the second time window is a time window switching the second offset from the moment of completing sending MsgA.

In some embodiments, the first offset is greater than the second offset, and/or the first length is smaller than the second length.

In an embodiment, the first offset may be greater than the second offset, and the first length may be smaller than the second length. Therefore, in case that the timing advance is determined by the terminal autonomously, the terminal may delay receiving the feedback information by a relatively large first offset, and/or the first length of the first time window for receiving the feedback information may be relatively short, so as to shorten the time consumption of the random access procedure. In case that the timing advance is determined by the terminal non-autonomously, the terminal may delay receiving the feedback information by a relatively small second offset, and/or the second length of the second time window for receiving the feedback information may be relatively long, so as to ensure that the feedback information from the base station is received, thus successfully completing the random access procedure.

In some embodiments, the first offset is equal to $2*d1/c$, or equal to $2*(d1+d0\_F)/c$, and the second offset is equal to $2*d0/c$, or equal to $2*(d0+d0\_F)/c$; where d1 is a distance from a network device in air to the terminal, do is a distance from the network device to a reference point on ground, $d0\_F$ is a distance from the network device to the base station on the ground, and c is a speed of light.

In an embodiment, in case that the timing advance is determined by the terminal autonomously, if a communication mode between the terminal and the base station is a satellite regeneration mode, since the satellite may be regarded as a base station, the first offset may be calculated according to the distance d1 from the satellite to the terminal, and the first offset is equal to $2*d1/c$. If the communication mode between the terminal and the base station is a satellite transparent transmission mode, the base station is a base station on ground, and the communication between the terminal and the base station needs to be performed through satellite transparent transmission, so that the first offset may be calculated according to the distance d1 from the satellite to the terminal and the distance $d0\_F$ from the satellite to the base station, and the first offset is equal to $2*(d0+d0\_F)/c$.

In an embodiment, in case that the timing advance is determined by the terminal non-autonomously, the terminal needs to receive the timing advance configured by the satellite or the base station. If a communication mode between the terminal and the base station is a satellite regeneration mode, since the satellite may be regarded as a base station, the second offset may be calculated according to the distance d0 from the satellite to the reference point on the ground, and the second offset is equal to $2*d0/c$. The second offset may be sent to the terminal. If the communication mode between the terminal and the base station is a satellite transparent transmission mode, the base station is a base station on ground, and the communication between the terminal and the base station needs to be performed through satellite transparent transmission, so that the second offset may be calculated according to the distance d0 from the satellite to the reference point on the ground, and the distance $d0\_F$ from the satellite to the base station, and the second offset is equal to $2*(d0+d0\_F)/c$. The second offset may be sent to the terminal.

In some embodiments, the first receiving timing information includes a third offset of a first contention resolution timer relative to a third receiving moment, and/or a first time duration of the first contention resolution timer, and/or the second receiving timing information includes a fourth offset of a second contention resolution timer relative to a fourth receiving moment, and/or a second time duration of the second contention resolution timer.

The third offset is different from the fourth offset, and/or the first time duration is different from the second time duration.

In an embodiment, the first receiving timing information and the second receiving timing information may include two parts, i.e., the offset and/or the second time duration of the contention resolution timer.

Specifically, the first receiving timing information may include the third offset of the first contention resolution timer for timing reception of the contention resolution information relative to the third receiving moment, and/or the first time duration of the first contention resolution timer. The second receiving timing information may include the fourth offset of the second contention resolution timer for timing reception of the contention resolution information relative to the fourth receiving moment, and/or the second time duration of the second contention resolution timer. The third offset may be different from the fourth offset, and/or the first time duration may be different from the second time duration.

The first receiving timing information may only include the third offset, or only include the first time duration of the first contention resolution timer, or include both the third offset and the first time duration of the first contention resolution timer. The second receiving timing information may only include the fourth offset, or only include the second time duration of the second contention resolution timer, or include both the fourth offset and the second time duration of the second contention resolution timer.

For example, the first receiving timing information includes the third offset and the first time duration of the first contention resolution timer, and the second receiving timing information includes the fourth offset and the second time duration of the second contention resolution timer.

In case that the timing advance is determined by the terminal autonomously, since the error of the delay to be compensated for is small, the terminal may relatively accurately determine the moment when the feedback information from the base station reaches, so that the relatively large third offset may be delayed to start receiving contention resolution information, and the first time duration of the first contention resolution timer for timing the reception of the contention resolution information may be relatively short, so as to shorten the time consumption of the random access procedure.

In case that the timing advance is determined by the terminal non-autonomously, since the error of the delay that needs to be compensated for is large, it is hard for the terminal to accurately determine the moment when the feedback information from the base station reaches, so that the relatively large fourth offset may be delayed to start receiving contention resolution information, and the second time duration of the second contention resolution timer for timing the reception of the contention resolution information may be relatively long, so as to ensure that the contention resolution information from the base station may be received, thus successfully completing the random access procedure (including two cases of contention resolution success and contention resolution failure).

FIG. 3 is a flowchart illustrating a method for random access according to an embodiment of the present disclosure. As shown in FIG. 3, receiving the feedback information from the base station during the random access procedure according to the first receiving timing information includes the following step S1012.

In step S1012, the first contention resolution timer is started in a time-domain symbol, and the time-domain symbol is a first time-domain symbol switching the third offset from the third receiving moment.

Alternatively, receiving the feedback information from the base station during the random access procedure accord-ing to the second receiving timing information includes starting the second contention resolution timer in a time-domain symbol, in which the time-domain symbol is a second time-domain symbol switching the fourth offset from the fourth receiving moment.

The above-mentioned symbols may refer to orthogonal frequency division multiplexing (OFDM) symbols.

In an embodiment, in case that the timing advance is determined by the terminal autonomously, the terminal may start the first contention resolution timer at the nearest time-domain symbol after the third offset from the third receiving moment, so as to receive the contention resolution information sent by the base station.

In an embodiment, in case that the timing advance is determined by the terminal non-autonomously, the terminal may start the second contention resolution timer at the nearest time-domain symbol after the fourth offset from the fourth receiving moment, so as to receive the contention resolution information sent by the base station.

In some embodiments, each of the third receiving moment and the fourth receiving moment is a moment that Msg3 for the random access procedure is sent completely.

In an embodiment, in case that the timing advance is determined by the terminal autonomously, the terminal may start the first contention resolution timer at the nearest time-domain symbol after the third offset from the moment of completing sending Msg3 for the random access procedure, so as to receive the contention resolution information sent by the base station.

In an embodiment, in case that the timing advance is determined by the terminal non-autonomously, the terminal may start the second contention resolution timer at the nearest time-domain symbol after the fourth offset from the moment of completing sending Msg3 for the random access procedure, so as to receive the contention resolution information sent by the base station.

In some embodiments, the third offset is greater than the fourth offset, and/or the first time duration is shorter than the second time duration.

In an embodiment, the third offset may be greater than the fourth offset, and the first time duration may be shorter than the second time duration. Therefore, in case that the timing advance is determined by the terminal autonomously, the terminal may delay receiving the feedback information by a relatively large third offset, and/or the first time duration of the first contention resolution timer may be relatively short, so as to shorten the time consumption of the random access procedure. In case that the timing advance is determined by the terminal non-autonomously, the terminal may delay receiving the feedback information by a relatively small fourth offset, and/or the second time duration of the second contention resolution timer may be relatively long, so as to ensure the reception of the feedback information from the base station, thus successfully completing the random access procedure.

In some embodiments, the third offset is equal to $2*d1/c$, or equal to $2*(d1+d0\_F)/c$, and the fourth offset is equal to $2*d0/c$, or equal to $2*(d0+d0\_F)/c$; where d1 is a distance from a network device in air to the terminal, d0 is a distance from the network device to a reference point on ground, d0_F is a distance from the network device to the base station on the ground, and c is a speed of light.

In an embodiment, in case that the timing advance is determined by the terminal autonomously, if a communication mode between the terminal and the base station is a satellite regeneration mode, since the satellite may be regarded as a base station, the third offset may be calculated according to the distance d1 from the satellite to the terminal, and the third offset is equal to $2*d1/c$. If the communication mode between the terminal and the base station is a satellite transparent transmission mode, the base station is a base station on ground, and the communication between the terminal and the base station needs to be performed through satellite transparent transmission, so that the third offset may be calculated according to the distance d1 from the satellite to the terminal and the distance d0_F from the satellite to the base station, and the third offset is equal to $2*(d0+d0\_F)/c$.

In an embodiment, in case that the timing advance is determined by the terminal non-autonomously, the terminal needs to receive the timing advance configured by the satellite or the base station. If a communication mode between the terminal and the base station is a satellite regeneration mode, since the satellite may be regarded as a base station, the fourth offset may be calculated according to the distance d0 from the satellite to the reference point on the ground, and the fourth offset is equal to $2*d0/c$. The fourth offset may be sent to the terminal. If the communication mode between the terminal and the base station is a satellite transparent transmission mode, the base station is a base station on ground, and the communication between the terminal and the base station needs to be performed through satellite transparent transmission, so that the fourth offset may be calculated according to the distance do from the satellite to the reference point on the ground, and the distance d0_F from the satellite to the base station, and the fourth offset is equal to $2*(d0+d0\_F)/c$. The fourth offset may be sent to the terminal.

FIG. 4 is a flowchart illustrating a method for random access according to an embodiment of the present disclosure. As shown in FIG. 4, the method includes the following step S102.

In step S102, indication information sent by the base station is received. The indication information includes the first receiving timing information and/or the second receiving timing information.

In an embodiment, the base station may send indication information to the terminal to indicate the first receiving timing information of the terminal, and indicate the second receiving timing information of the terminal. The indication information may be further configured to indicate the first receiving timing information and the second receiving timing information of the terminal. In case that the timing advance is determined by the terminal autonomously, the terminal may receive the feedback information from the base station during the random access procedure according to the first receiving timing information. In case that the timing advance is determined by the terminal non-autonomously, the terminal may receive the feedback information from the base station during the random access procedure according to the first receiving timing information.

It is noted that step S102 may be performed before the terminal initiates random access.

FIG. 5 is a flowchart illustrating a method for configuration indication according to an embodiment of the present disclosure. The method in the embodiments may be applied to a base station in a non-terrestrial network, and the base station may be a base station located on the ground in the non-terrestrial network, or a network device located in air in the non-terrestrial network, such as a satellite, an aerial platform, and the like. The base station may communicate with a terminal as a user equipment, and the terminal includes, but is not limited to, an electronic equipment such as a mobile phone, a tablet computer, a wearable device, a sensor, and an Internet of Things device. The following is an exemplary description in case that the network device is a satellite.

As shown in FIG. 5, the method for configuration indication may include the following steps S201.

In step S201, indication information including the first receiving timing information and the second receiving timing information is sent to a terminal. The indication information is configured to indicate the terminal to in response to the timing advance being determined autonomously, receive feedback information from the base station during a random access procedure according to the first receiving timing information, and in response to the timing advance being determined non-autonomously, receive feedback information from the base station during the random access procedure according to the second receiving timing information.

The first receiving timing information is different from the second receiving timing information.

According to embodiments of the present disclosure, the base station may indicate different receiving timing information in case that the timing advance is determined by the terminal autonomously and in case that the timing advance is determined by the terminal non-autonomously, so that the terminal may receive the feedback information from the base station during the random access procedure based on the first receiving timing information in case that the timing advance is determined by the terminal autonomously, and receive the feedback information from the base station during the random access procedure based on the second receiving timing information in case that the timing advance is determined by the terminal non-autonomously. The first receiving timing information is different from the second receiving timing information.

That is, the terminal may receive the feedback information from the base station based on different receiving timing information, such as Msg2, Msg4 or the like in case that the timing advance is determined by the terminal autonomously and in case that the timing advance is determined by the terminal non-autonomously.

For example, the above-mentioned receiving timing information includes two parts of information, i.e., an offset and a length of a time window. In case that the timing advance is determined by the terminal autonomously, since the error of the delay that needs to be compensated for is small, the terminal may relatively accurately determine a moment when the feedback information from the base station reaches, so that the feedback information may be received after an offset with a relatively large delay. The length of the time window for receiving the feedback information may be relatively short, so as to shorten the time consumption of the random access procedure.

In case that the timing advance is determined by the terminal non-autonomously, since the error of the delay that needs to be compensated for is large, it is hard for the terminal to accurately determine a moment when the feedback information from the base station reaches, so that the feedback information may be received after an offset with a relatively small delay. The length of the time window for receiving the feedback information may be relatively long, so as to ensure that the feedback information from the base station may be received, thus successfully completing the random access procedure.

In some embodiments, the first receiving timing information includes a first offset of a first time window for receiving a random access response relative to a first receiving moment, and/or a first length of the first time window.

Alternatively, the second receiving timing information includes a second offset of a second time window for receiving a random access response relative to a second receiving moment, and/or a second length of the second time window.

The first offset is different from the second offset, and/or the first length is different from the second length.

In an embodiment, the first receiving timing information and the second receiving timing information may include two parts, i.e., the offset and/or the length of the time window.

Specifically, the first receiving timing information may include the first offset of the first time window for receiving the random access response relative to the first receiving moment, and/or the first length of the first time window. The second receiving timing information may include the second offset of the second time window for receiving the random access response relative to the second receiving moment, and/or the second length of the second time window. The first offset may be different from the second offset, and/or the first length may be different from the second length.

The first receiving timing information may only include the first offset, or only include the first length of the first time window, or include both the first offset and the first length of the first time window. The second receiving timing information may only include the second offset, or only include the second length of the second time window, or include both the second offset and the second length of the second time window.

For example, the first receiving timing information includes the first offset and the first length of the first time window, and the second receiving timing information includes the second offset and the second length of the second time window.

In case that the timing advance is determined by the terminal autonomously, since the error of the delay that needs to be compensated for is small, the terminal may relatively accurately determine the moment when the feedback information from the base station reaches, so that the feedback information may be received after the first offset with a relatively large delay. The first length of the first time window for receiving the feedback information may be relatively short, so as to shorten the time consumption of the random access procedure.

In case that the timing advance is determined by the terminal non-autonomously, since the error of the delay that needs to be compensated for is large, it is hard for the terminal to accurately determine the moment when the feedback information from the base station reaches, so that the feedback information may be received after the second offset with a relatively small delay, and the second length of the second time window for receiving the feedback information may be relatively long, so as to ensure that the feedback information from the base station may be received, thus successfully completing the random access procedure.

In some embodiments, each of the first receiving moment and the second receiving moment is a moment that Msg1 or MsgA for the random access procedure is sent completely.

In an embodiment, during a four-step random access procedure, the terminal may receive, in the first time window, the random access response information sent by the base station through the nearest physical downlink control channel occasion, the first time window is a time window switching the first offset from the moment of completing sending Msg1.

In an embodiment, during a two-step random access procedure, the terminal may receive, in the second time window, the random access response information sent by the base station through the nearest physical downlink control channel occasion, and the second time window is a time window switching the second offset from the moment of completing sending MsgA.

In some embodiments, the first offset is greater than the second offset, and/or the first length is smaller than the second length.

In an embodiment, the first offset may be greater than the second offset, and the first length may be smaller than the second length. Therefore, in case that the timing advance is determined autonomously, the terminal may delay receiving the feedback information by a relatively large first offset, and/or the first length of the first time window for receiving the feedback information may be relatively short, so as to shorten the time consumption of the random access procedure. In case that the timing advance is determined by the terminal non-autonomously, the terminal may delay receiving the feedback information by a relatively small second offset, and/or the second length of the second time window for receiving the feedback information may be relatively long, so as to ensure that the feedback information from the base station is received, thus successfully completing the random access procedure.

In some embodiments, the first offset is equal to $2*d1/c$, or equal to $2*(d1+d0\_F)/c$, and the second offset is equal to $2*d0/c$, or equal to $2*(d0+d0\_F)/c$; where d1 is a distance from a network device in air to the terminal, d0 is a distance from the network device to a reference point on ground, d0_F is a distance from the network device to the base station on the ground, and c is a speed of light.

In an embodiment, in case that the timing advance is determined autonomously if a communication mode between the terminal and the base station is a satellite regeneration mode, since the satellite may be regarded as a base station, the first offset may be calculated according to the distance d1 from the satellite to the terminal, and the first offset is equal to $2*d1/c$. If the communication mode between the terminal and the base station is a satellite transparent transmission mode, the base station is a base station on ground, and the communication between the terminal and the base station needs to be performed through satellite transparent transmission, so that the first offset may be calculated according to the distance d1 from the satellite to the terminal and the distance d0_F from the satellite to the base station, and the first offset is equal to $2*(d0+d0\_F)/c$.

In an embodiment, in case that the timing advance is determined non-autonomously, the terminal needs to receive the timing advance configured by the satellite or the base station. If a communication mode between the terminal and the base station is a satellite regeneration mode, since the satellite may be regarded as a base station, the second offset may be calculated according to the distance d0 from the satellite to the reference point on the ground, and the second offset is equal to $2*d0/c$. The second offset may be sent to the terminal. If the communication mode between the terminal and the base station is a satellite transparent transmission mode, the base station is a base station on ground, and the communication between the terminal and the base station needs to be performed through satellite transparent transmission, so that the second offset may be calculated according to the distance d0 from the satellite to the reference point on the ground, and the distance d0_F from the satellite to the base station, and the second offset is equal to $2*(d0+d0\_F)/c$. The second offset may be sent to the terminal.

In some embodiments, the first receiving timing information includes a third offset of a first contention resolution timer relative to a third receiving moment, and/or a first time duration of the first contention resolution timer; and/or the second receiving timing information includes a fourth offset of a second contention resolution timer relative to a fourth receiving moment, and/or a second time duration of the second contention resolution timer.

In an embodiment, the first receiving timing information and the second receiving timing information may include two parts, i.e., the offset and/or the second time duration of the contention resolution timer.

Specifically, the first receiving timing information may include the third offset of the first contention resolution timer for timing reception of the contention resolution information relative to the third receiving moment, and/or the first time duration of the first contention resolution timer. The second receiving timing information may include the fourth offset of the second contention resolution timer for timing reception of the contention resolution information relative to the fourth receiving moment, and/or the second time duration of the second contention resolution timer. The third offset may be different from the fourth offset, and/or the first time duration may be different from the second time duration.

The first receiving timing information may only include the third offset, or only include the first time duration of the first contention resolution timer, or include both the third offset and the first time duration of the first contention resolution timer. The second receiving timing information may only include the fourth offset, or only include the second time duration of the second contention resolution timer, or include both the fourth offset and the second time duration of the second contention resolution timer.

For example, the first receiving timing information includes the third offset and the first time duration of the first contention resolution timer, and the second receiving timing information includes the fourth offset and the second time duration of the second contention resolution timer.

In case that the timing advance is determined autonomously, since the error of the delay to be compensated for is small, the terminal may relatively accurately determine the moment when the feedback information from the base station reaches, so that the relatively large third offset may be delayed to start receiving contention resolution information, and the first time duration of the first contention resolution timer for timing the reception of the contention resolution information may be relatively short, so as to shorten the time consumption of the random access procedure.

In case that the timing advance is determined non-autonomously, since the error of the delay that needs to be compensated for is large, it is hard for the terminal to accurately determine the moment when the feedback information from the base station reaches, so that the relatively large fourth offset may be delayed to start receiving contention resolution information, and the second time duration of the second contention resolution timer for timing the reception of the contention resolution information may be relatively long, so as to ensure that the contention resolution information from the base station may be received, thus successfully completing the random access procedure (including two cases of contention resolution success and contention resolution failure).

In some embodiments, the third offset is greater than the fourth offset, and/or the first time duration is shorter than the second time duration.

In an embodiment, the third offset may be greater than the fourth offset, and the first time duration may be shorter than the second time duration. Therefore, in case that the timing advance is determined by the terminal autonomously, the terminal may delay receiving the feedback information by a relatively large third offset, and/or the first time duration of the first contention resolution timer may be relatively short, so as to shorten the time consumption of the random access procedure. In case that the timing advance is determined by the terminal non-autonomously, the terminal may delay receiving the feedback information by a relatively small fourth offset, and/or the second time duration of the second contention resolution timer may be relatively long, so as to ensure the reception of the feedback information from the base station, thus successfully completing the random access procedure.

In some embodiments, the third offset is equal to $2*d1/c$, or equal to $2*(d1+d0\_F)/c$, and the fourth offset is equal to $2*d0/c$, or equal to $2*(d0+d0\_F)/c$; where, d1 is a distance from a network device in air to the terminal, d0 is a distance from the network device to a reference point on ground, d0\_F is a distance from the network device to the base station on the ground, and c is a speed of light.

In an embodiment, in case that the timing advance is determined autonomously, if a communication mode between the terminal and the base station is a satellite regeneration mode, since the satellite may be regarded as a base station, the third offset may be calculated according to the distance d1 from the satellite to the terminal, and the third offset is equal to $2*d1/c$. If the communication mode between the terminal and the base station is a satellite transparent transmission mode, the base station is a base station on ground, and the communication between the terminal and the base station needs to be performed through satellite transparent transmission, so that the third offset may be calculated according to the distance d1 from the satellite to the terminal and the distance d0\_F from the satellite to the base station, and the third offset is equal to $2*(d0+d0\_F)/c$.

In an embodiment, in case that the timing advance is determined non-autonomously, the terminal needs to receive the timing advance configured by the satellite or the base station. If a communication mode between the terminal and the base station is a satellite regeneration mode, since the satellite may be regarded as a base station, the fourth offset may be calculated according to the distance do from the satellite to the reference point on the ground, and the fourth offset is equal to $2*d0/c$. The fourth offset may be sent to the terminal. If the communication mode between the terminal and the base station is a satellite transparent transmission mode, the base station is a base station on ground, and the communication between the terminal and the base station needs to be performed through satellite transparent transmission, so that the fourth offset may be calculated according to the distance do from the satellite to the reference point on the ground, and the distance d0\_F from the satellite to the base station, and the fourth offset is equal to $2*(d0+d0\_F)/c$. The fourth offset may be sent to the terminal.

Corresponding to the above-mentioned embodiments of the method for random access and the method for configuration indication, the present disclosure also provides embodiments of an apparatus for random access device and an apparatus for configuration indication.

FIG. 6 is a block diagram illustrating an apparatus for random access according to an embodiment of the present disclosure. The apparatus in the embodiments may be applied to terminals in non-terrestrial networks, and the terminals include, but are not limited to, electronic devices such as mobile phones, tablet computers, wearable devices, sensors, and Internet of Things devices. The terminal may serve as a user equipment to communicate with a base station, and the base station may be a base station located on the ground in the non-terrestrial network, or a network device located in air in a non-terrestrial network, such as a satellite, an aerial platform, and the like. The following is an exemplary description in a case that the network device is a satellite.

As shown in FIG. 6, the apparatus for random access may include a feedback receiving module 101 configured to in response to a timing advance being determined by the terminal autonomously, receive feedback information from a base station during a random access procedure according to first receiving timing information, and in response to the timing advance being determined by the terminal non-autonomously, receive feedback information from the base station during the random access procedure according to second receiving timing information.

The first receiving timing information is different from the second receiving timing information.

In some embodiments, the first receiving timing information includes a first offset of a first time window for receiving a random access response relative to a first receiving moment, and/or a first length of the first time window.

Alternatively, the second receiving timing information includes a second offset of a second time window for receiving a random access response relative to a second receiving moment, and/or a second length of the second time window.

The first offset is different from the second offset, and/or the first length is different from the second length.

In some embodiments, the feedback receiving module is configured to receive, in the first time window, random access response information sent by the base station through a nearest physical downlink control channel occasion, in which the first time window is a time window switching the first offset from the first receiving moment, and/or receive the feedback information from the base station during the random access procedure according to the second receiving timing information includes receiving, in the second time window, random access response information sent by the base station through a nearest physical downlink control channel occasion, in which the second time window is a time window switching the second offset from the second receiving moment.

In some embodiments, each of the first receiving moment and the second receiving moment is a moment that Msg1 or MsgA for the random access procedure is sent completely.

In some embodiments, the first offset is larger than the second offset, and/or the first length is smaller than the second length.

In some embodiments, the first offset is equal to 2*d1/c, or equal to 2*(d1+d0_F)/c; and the second offset is equal to 2*d0/c, or equal to 2*(d0+d0_F)/c; where, d1 is a distance from a network device in air to the terminal, d0 is a distance from the network device to a reference point on ground, d0_F is a distance from the network device to the base station on the ground, and c is a speed of light.

In some embodiments, the first receiving timing information includes a third offset of a first contention resolution timer relative to a third receiving moment, and/or a first time duration of the first contention resolution timer.

Alternatively, the second receiving timing information includes a fourth offset of a second contention resolution timer relative to a fourth receiving moment, and/or a second time duration of the second contention resolution timer.

The third offset is different from the fourth offset, and/or the first time duration is different from the second time duration.

In some embodiments, the feedback receiving module is configured to start a first contention resolution timer in a time-domain symbol, in which the time-domain symbol is a first time-domain symbol switching the third offset from the third receiving moment; and/or start the second contention resolution timer in a time-domain symbol, in which the time-domain symbol is a second time-domain symbol switching the fourth offset from the fourth receiving moment.

In some embodiments, each of the third receiving moment and the fourth receiving moment is a moment that Msg3 for the random access procedure is sent completely.

In some embodiments, the third offset is greater than the fourth offset, and/or the first time duration is shorter than second time duration.

In some embodiments, the third offset is equal to 2*d1/c, or equal to 2*(d1+d0_F)/c; and the fourth offset is equal to 2*d0/c, or equal to 2*(d0+d0_F)/c; where, d1 is a distance from a network device in air to the terminal, d0 is a distance from the network device to a reference point on ground, d0_F is a distance from the network device to the base station on the ground, and c is a speed of light.

FIG. 7 is a block diagram of an apparatus for random access according to an embodiment of the present disclosure. As shown in FIG. 7, the apparatus further includes an indication receiving module 102 configured to receive indication information sent by the base station. The indication information includes the first receiving timing information and/or the second receiving timing information.

FIG. 8 is a block diagram illustrating for an apparatus for configuration indicating according to an embodiment of the present disclosure.

The apparatus shown in the embodiment may be applied to a base station in a non-terrestrial network, and the base station may be a base station located on the ground in the non-terrestrial network, or a network device located in air in the non-terrestrial network, such as a satellite, an aerial platform, and the like. The base station may communicate with a terminal as a user equipment, and the terminal includes, but is not limited to, mobile phones, tablet computers, wearable devices, sensors, Internet of Things devices and other electronic devices. The following is an exemplary description in the case that the network device is a satellite.

As shown in FIG. 8, the apparatus for configuration indication may include an instruction sending module 201 configured to send instruction information including first receiving timing information and second receiving timing information to the terminal. The instruction information is configured to indicate the terminal to in response to a timing advance being determined autonomously, receive feedback information from the base station during a random access procedure according to the first receiving timing information, and in response to the timing advance being determined non-autonomously, receive feedback information from the base station during the random access procedure according to the second receiving timing information.

The first receiving timing information is different from the second receiving timing information.

In some embodiments, the first receiving timing information includes a first offset of a first time window for receiving a random access response relative to a first receiving moment, and/or a first length of the first time window.

Alternatively, the second receiving timing information includes a second offset of a second time window for receiving a random access response relative to a second receiving moment, and/or a second length of the second time window.

The first offset is different from the second offset, and/or the first length is different from the second length.

In some embodiments, each of the first receiving moment and the second receiving moment is a moment that Msg1 or MsgA for the random access procedure is sent completely.

In some embodiments, the first offset is greater than the second offset, and/or the first length is smaller than the second length.

In some embodiments, the first offset is equal to $2*d1/c$, or equal to $2*(d1+d0\_F)/c$; and the second offset is equal to $2*d0/c$, or equal to $2*(d0+d0\_F)/c$; where, d1 is a distance from a network device in air to the terminal, d0 is a distance from the network device to a reference point on ground, d0\_F is a distance from the network device to the base station on the ground, and c is a speed of light.

In some embodiments, the first receiving timing information includes a third offset of a first contention resolution timer relative to a third receiving moment, and/or a first time duration of the contention resolution timer.

Alternatively, the second receiving timing information includes a fourth offset of a second contention resolution timer relative to a fourth receiving moment, and/or a second time duration of the second contention resolution timer.

The third offset is different from the fourth offset, and/or the first time duration is different from the second time duration.

In some embodiments, the third offset is greater than the fourth offset, and/or the first time duration is shorter than the second time duration.

In some embodiments, the third offset is equal to $2*d1/c$, or equal to $2*(d1+d0\_F)/c$; and the fourth offset is equal to $2*d0/c$, or equal to $2*(d0+d0\_F)/c$; where, d1 is a distance from a network device in air to the terminal, d0 is a distance from the network device to a reference point on ground, d0\_F is a distance from the network device to the base station on the ground, and c is a speed of light.

With regard to the apparatus in the above-mentioned embodiments, the specific manners for executing the operation in each module has been described in detail in the method embodiments, which will not be described in detail here.

Since the device embodiments basically correspond to the method embodiments, reference may be made on the related description of the method embodiments. The device embodiments described above are only illustrative, and the modules described as separate components may or may not be physically separated, and the components shown as modules may or may not be physical modules, that is, they may be located in one place, or they may be distributed to a plurality of network modules. Part or all of the modules may be selected according to actual needs to achieve a purpose of a solution of embodiments in the present disclosure. It is understood and implemented by those skilled in the art without creative efforts.

Embodiments of the present disclosure also provide an electronic device, and the electronic device includes a processor; and a memory for storing instructions executable by the processor.

The processor is configured to implement the instructions to perform the method for random access in any one of the above-mentioned embodiments and/or the method for configuration indication in any one of the above-mentioned embodiments.

Embodiments of the present disclosure also provide a computer-readable storage medium. The computer-readable storage medium has stored therein computer programs that, when executed by a processor, cause steps of the method for random access in any one of the above-mentioned embodiments and/or the method for configuration indication in any one of the above-mentioned embodiments to be implemented.

As shown in FIG. 9, FIG. 9 is a block diagram of a device 900 for configuration indication according to an embodiment of the present disclosure. The device 900 may be provided as a base station. Referring to FIG. 9, the device 900 includes a processing component 922, a wireless transmitting/receiving component 924, an antenna component 926, and a signal processing component specific to a wireless interface. The processing component 922 may further include one or more processors. One of the processors in the processing component 922 may be configured to implement the method for random access described in any one of the above-mentioned embodiments.

FIG. 10 is a block diagram of a device 1000 for random access according to an embodiment of the present disclosure. For example, the device 1000 may be a mobile phone, a computer, a digital broadcast terminal, a messaging device, a game console, a tablet device, a medical device, a fitness device, a personal digital assistant, or the like.

As shown in FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or some of the steps in the above-described method for random access. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, videos, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as keyboards, click wheels, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wireless, between the device 1000 and other devices. The device 1000 can access a wireless network based on a communication standard, such as WiFi, 2G, 3G, 4G LTE, 5G NR, or a combination thereof. In one illustrative embodiment, the communication component 1016 receives a broadcast signal or broadcast associated information from an external broadcast management system via a broadcast channel. In one illustrative embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described method for random access.

In illustrative embodiments, there is also provided a non-transitory computer-readable storage medium including instructions, such as included in the memory 1004, executable by the processor 1020 in the device 1000, for performing the above-described method for random access. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including such departures from the present disclosure as come within known or customary practice in the art. It is intended that the specification and the examples be considered as illustrative only, with a true scope and spirit of the embodiments of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

It could be understood that in the specification, the terms "first", "second", etc. are only used to distinguish an entity or operation from another entity or operation, and do not require or imply that there is an actual relationship or order between these entities or operations. The terms "comprise", "include" or any other variation thereof are intended to cover a non-exclusive inclusion, so that a process, method, article or apparatus including a series of elements includes not only those elements but also other elements not expressly listed, or also elements inherent in the process, method, article, or apparatus. Without further limitations, an element defined by a phrase "comprising a . . . " does not exclude presence of additional identical elements in the process, method, article or apparatus including the element.

The methods and the apparatus provided by embodiments of the present disclosure have been described above in detail. In the specification, embodiments have been used to illustrate principles and implementations of the present disclosure. The descriptions of the above-mentioned embodiments are only used to help understand methods and core ideas of the present disclosure. At the same time, for those skilled in the art, according to the idea of the present disclosure, there will be changes in a specific implementation and an application scope. In summary, the content of the specification is not to be understood as limitation on the present disclosure.

What is claimed is:

1. A method for random access, applied to a terminal and comprising:

receiving feedback information from a base station during a random access procedure according to at least one of first receiving timing information or second receiving timing information;

wherein the first receiving timing information and the second receiving timing information correspond to different manners for determining a timing advance by the terminal;

wherein the first receiving timing information is different from the second receiving timing information;

wherein the first receiving timing information comprises at least one of a first offset of a first time window for receiving a random access response relative to a first receiving moment, or a first length of the first time window; and/or the second receiving timing information comprises at least one of a second offset of a second time window for receiving a random access response relative to a second receiving moment, or a second length of the second time window; and wherein the first offset is different from the second offset, and/or the first length is different from the second length.

2. The method according to claim 1, wherein receiving the feedback information from the base station during the random access procedure according to the first receiving timing information comprises:

receiving, in the first time window, random access response information sent by the base station through a nearest physical downlink control channel occasion, wherein the first time window is a time window switching the first offset from the first receiving moment; and/or receiving the feedback information from the base station during the random access procedure according to the second receiving timing information comprises:

receiving, in the second time window, random access response information sent by the base station through a nearest physical downlink control channel occasion, wherein the second time window is a time window switching the second offset from the second receiving moment.

3. The method according to claim 1, wherein each of the first receiving moment and the second receiving moment is a moment that Msg1 or MsgA for the random access procedure is sent completely.

4. The method according to claim 1, wherein
the first offset is greater than the second offset,
and/or
the first length is smaller than the second length.

5. The method according to claim 1, wherein the first offset is equal to 2*d1/c, or equal to 2*(d1+d0_F)/c;
the second offset is equal to 2*d0/c, or equal to 2*(d0+d0_F)/c;
where, d1 is a distance from a network device in air to the terminal, d0 is a distance from the network device to a reference point on ground, d0_F is a distance from the network device to the base station on the ground, and c is a speed of light.

6. The method according to claim 1, wherein
the first receiving timing information comprises at least one of a third offset of a first contention resolution timer relative to a third receiving moment, or a first time duration of the first contention resolution timer;

and/or the second receiving timing information comprises at least one of a fourth offset of a second contention resolution timer relative to a fourth receiving moment, or a second time duration of the second contention resolution timer;

wherein the third offset is different from the fourth offset, and/or the first time duration is different from the second time duration.

7. The method according to claim 6, wherein receiving the feedback information from the base station during the random access procedure according to the first receiving timing information comprises: starting the first contention resolution timer in a time-domain symbol, wherein the time-domain symbol is a first time-domain symbol switching the third offset from the third receiving moment;

and/or receiving the feedback information from the base station during the random access procedure according to the second receiving timing information comprises:

starting the second contention resolution timer in a time-domain symbol, wherein the time-domain symbol is a second time-domain symbol switching the fourth offset from the fourth receiving moment.

8. The method according to claim 6, wherein each of the third receiving moment and the fourth receiving moment is a moment that Msg3 for the random access procedure is sent completely.

9. The method according to claim 6, wherein
the third offset is greater than the fourth offset,
and/or
the first time duration is shorter than the second time duration.

10. The method according to claim 6, wherein the third offset is equal to 2*d1/c, or equal to 2*(d1+d0_F)/c;
the fourth offset is equal to 2*d0/c, or equal to 2*(d0+d0_F)/c;
where, d1 is a distance from a network device in air to the terminal, d0 is a distance from the network device to a reference point on ground, d0_F is a distance from the network device to the base station on the ground, and c is a speed of light.

11. The method according to claim 1, further comprising:
receiving indication information sent by the base station;
wherein the indication information comprises the first receiving timing information and/or the second receiving timing information.

12. The method according to claim 1, further comprising:
receiving the feedback information from the base station during the random access procedure according to the first receiving timing information in response to the timing advance being determined by the terminal autonomously.

13. The method according to claim 1, further comprising:
receiving the feedback information from the base station during the random access procedure according to the second receiving timing information in response to the timing advance being determined by the terminal non-autonomously.

14. A method for configuration indication, applied to a base station and comprising:
sending indication information comprising first receiving timing information and second receiving timing information to a terminal;
wherein the indication information is configured to indicate the terminal to in response to a timing advance being determined autonomously, receive feedback information from the base station during a random access procedure according to the first receiving timing information, and in response to the timing advance being determined non-autonomously, receive feedback information from the base station during the random access procedure according to the second receiving timing information;

wherein the first receiving timing information is different from the second receiving timing information;

wherein the first receiving timing information comprises at least one of a first offset of a first time window for receiving a random access response relative to a first receiving moment, or a first length of the first time window; and/or the second receiving timing information comprises at least one of a second offset of a second time window for receiving a random access response relative to a second receiving moment, or a second length of the second time window; and wherein the first offset is different from the second offset, and/or the first length is different from the second length.

15. The method according to claim 14, wherein each of the first receiving moment and the second receiving moment is a moment that Msg1 or MsgA for the random access procedure is sent completely.

16. The method according to claim 14, wherein the first offset is equal to 2*d1/c, or equal to 2*(d1+d0_F)/c;

the second offset is equal to 2*d0/c, or equal to 2*(d0+ d0_F)/c;

where, d1 is a distance from a network device in air to the terminal, d0 is a distance from the network device to a reference point on ground, d0_F is a distance from the network device to the base station on the ground, and c is a speed of light.

17. The method according to claim 14, wherein the first receiving timing information comprises at least one of a third offset of a first contention resolution timer relative to a third receiving moment, or a first time duration of the contention resolution timer; and/or the second receiving timing information comprises at least one of a fourth offset of a second contention resolution timer relative to a fourth receiving moment, or a second time duration of the second contention resolution timer;

wherein the third offset is different from the fourth offset, and/or the first time duration is different from the second time duration.

18. A terminal, comprising:

a processor; and a memory for storing instructions executable by the processor;

wherein the processor is configured to:

receive feedback information from a base station during a random access procedure according to at least one of first receiving timing information or second receiving timing information;

wherein the first receiving timing information and the second receiving timing information correspond to different manners for determining a timing advance by the terminal;

wherein the first receiving timing information is different from the second receiving timing information;

wherein the first receiving timing information comprises at least one of a first offset of a first time window for receiving a random access response relative to a first receiving moment, or a first length of the first time window; and/or the second receiving timing information comprises at least one of a second offset of a second time window for receiving a random access response relative to a second receiving moment, or a second length of the second time window; and wherein the first offset is different from the second offset, and/or the first length is different from the second length.

\* \* \* \* \*